United States Patent [19]

Putnam, Jr. et al.

[11] 4,125,272
[45] Nov. 14, 1978

[54] SELF-ALIGNING TOWING HITCH

[75] Inventors: Cecil J. Putnam, Jr.; James E. Malone, both of Union City, Mich.

[73] Assignee: Putnam Pattern & Engineering Co., Coldwater, Mich.

[21] Appl. No.: 776,830

[22] Filed: Mar. 14, 1977

[51] Int. Cl.² ............................................. B60D 1/16
[52] U.S. Cl. ................................................. 280/478 B
[58] Field of Search ............... 280/477, 478 R, 478 B, 280/778 A

[56] References Cited

U.S. PATENT DOCUMENTS

| 3,243,202 | 3/1966 | Carson | 280/478 A |
|---|---|---|---|
| 3,329,445 | 7/1967 | Carson | 280/478 B |
| 3,521,908 | 7/1970 | Carter | 280/478 B |
| 3,774,943 | 11/1973 | Schmiesing | 280/479 R |

Primary Examiner—Joseph F. Peters, Jr.
Assistant Examiner—R. Schrecengost
Attorney, Agent, or Firm—Beaman & Beaman

[57] ABSTRACT

A hitch for vehicle trailers for facilitating interconnection of the tow and towed vehicles, suitable for use with recreational vehicle trailers, wherein the hitch includes an extensible and universally pivotable support for one of the hitch components permitting an easily achieved interconnection between the vehicles whereby the tow vehicle can pull the trailer to a near alignment and the hitch members to a towable condition.

7 Claims, 9 Drawing Figures

FIG. 4, FIG. 5, FIG. 6, FIG. 7

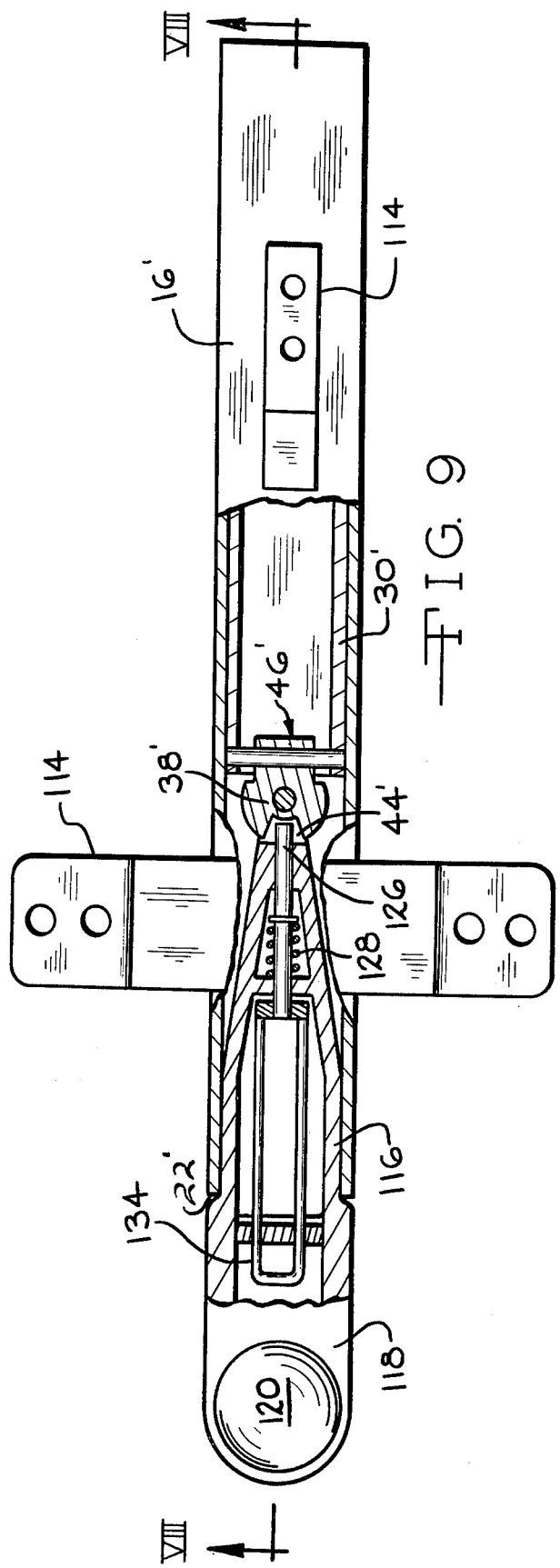
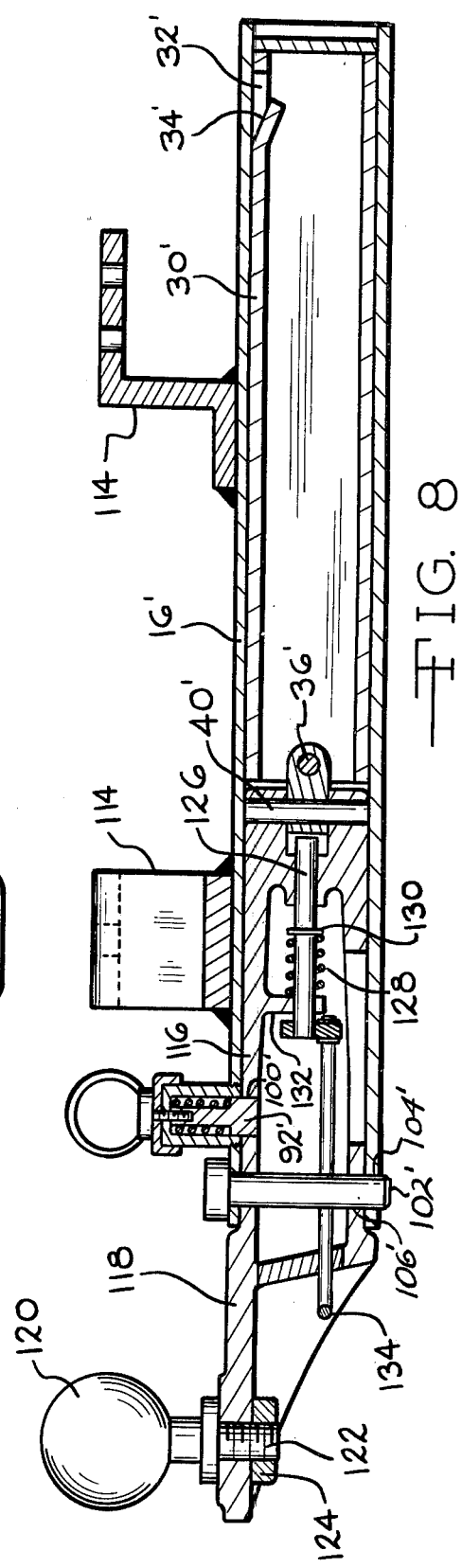

SELF-ALIGNING TOWING HITCH

BACKGROUND OF THE INVENTION

The invention pertains to self-aligning hitches for towed vehicles.

Difficulty has long been experienced by the drivers of tow vehicles, such as tractors, trucks and automobiles, in orienting the tow vehicle to the vehicle to be towed, such as a trailer. Considerable maneuvering is usually required to properly locate the hitch apparatus of the tow vehicle to the hitch of the trailer, and where the trailer if of considerable weight, and may not be readily manually moved, high driving skills and patience are required in conjunction with the services of an observer, particularly when employing an automobile, as the driver cannot observe the exact location of the automobile hitch structure.

Efforts have been made to overcome the aforementioned difficulties in connecting trailers to tow vehicles by the use of adjustable hitch devices which permit the hitch to be manually adjusted prior to the hitch being positioned in a towable condition. It is known to utilize extendsible trailer tongues, and bifurcated tongues, as well as employ other means for manually adjusting the hitch apparatus of either the tow or towed vehicles. Such known devices often permit a prehitching to be accomplished which may be readily manually achieved once the tow and towed vehicles are approximately aligned, and final alignment and the establishing of a towable condition is achieved after prehitching has occurred. U.S. Pat. Nos. 3,738,683; 3,740,078; 3,860,267 and 3,904,225 are indicative of such apparatus.

However, known self-aligning trailer hitch apparatus is often very expensive, large and cumbersome, and not capable of meeting the necessary safety standards. Further, such known devices are not of such construction as to provide dependable establishment of the hitch to a towable condition after the prehitch phase has been completed, and the limitations of known devices have not permitted such devices to meet all the necessary prerequisites of a self-aligning trailer hitch.

SUMMARY OF THE INVENTION

It is an object of the invention to produce a self-aligning towing hitch which is of a concise configuration, economically practical, of high strength and excellent safety characteristics, readily operable by the unskilled, and relatively fool-proof in operation.

Another object of the invention is to provide a self-aligning towing hitch capable of permitting the tow and towed vehicles to be prehitched even though substantially misaligned, and wherein a simple sequential forward and reverse movement of the tow vehicle after the prehitching orients the vehicles and positions the hitch apparatus in the towable condition.

Yet a further object of the invention is to provide a self-aligning hitch for towed vehicles which permits a hitch component to be moved either horizontally or vertically for prehitching purposes, and wherein automatic alignment of the tow and towed vehicles occurs during positioning of the hitch to its towing condition.

In the practice of the invention, the self-aligning hitch structure, which may be mounted upon either the tow or towed vehicle, includes a guide tube of rectangular transverse cross section rigidly mounted to its associated vehicle. A slide is slidably mounted within the guide tube having a transverse rectangular configuration corresponding to that of the tube and is movable within the tube between retracted and extended positions. An arm pivotally mounted to the slide by means of a universal joint supports one of the vehicle hitch components and, when the slide and arm are in the extended position, the universal joint permits the arm and hitch component to be universally adjusted relative to the tube to accommodate the vertical position of the other vehicle hitch component, and the ability of the arm to be positioned within the tube permits adjustment of the distance existing between the hitch components when the tow vehicle is initially positioned.

After the hitch components of the tow and towed vehicles are prehitched, the tow vehicle is moved in a forward direction to pull the trailer a sufficient distance to produce a predetermined angular alignment between the arm and the tube. During such vehicle movement the towed vehicle weight is supported upon a caster, jack or other known movable support. Upon the predetermined vehicle angular relationship being achieved, detent means lock the arm and slide in a predetermined angular relationship whereby reversal of the direction of travel of the tow vehicle retracts the slide and arm into the guide tube and, during such retraction, final precise alignment between the tow and towed vehicles is achieved by guide edges defined on the open end of the tube engaging lateral sides of the arm. Once full retraction of the slide and arm into the tube is achieved proper alignment between the vehicles exists and a locking pin is inserted through the tube and arm to insure maintaining the arm in a safe towing condition.

The hitch in accord with the invention permits one operator to readily hitch a heavy recreational trailer to an automobile without assistance, and the aforedescribed apparatus and sequence of operation significantly reduces the likelihood of the operator being hurt or overstressed during the hitching procedure.

BRIEF DESCRIPTION OF THE DRAWINGS

The aforementioned objects and advantages of the invention will be appreciated from the following description and accompanying drawings wherein:

FIG. 4 is an elevational sectional view of self-aligning towing hitch apparatus in accord with the invention of the type mounted upon the towed vehicle, the hitch components being shown in the fully retracted condition, FIG. 5 is a sectional plan view of the hitch of FIG. 4, FIG. 6 is a detail, sectional view of the joint, slide and arm at the condition shown in FIG. 1, FIG. 7 is a view similar to FIG. 6 illustrating the joint, slide and arm at the condition shown in FIG. 2, FIG. 8 is an elevational sectional view of an embodiment of the self-aligning hitch of the invention suitable for mounting upon the tow vehicle illustrating the components in the retracted position, and FIG. 9 is a plan view, partially sectioned, of the embodiment of FIG. 8.

DESCRIPTION OF THE PREFERRED EMBODIMENTS

Figure 1:
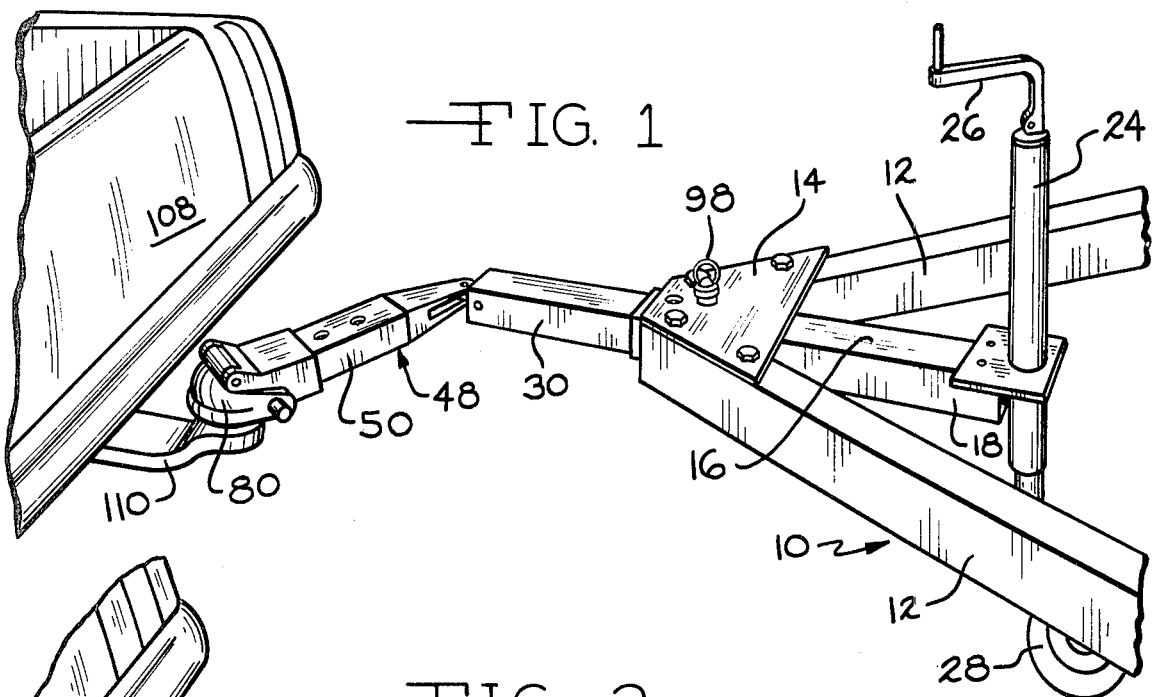
FIG. 1 is a perspective view of a self-aligning towing hitch in accord with the invention illustrating the hitch components in an extended misaligned condition upon completion of the prehitching procedure.

The concepts of the invention may be utilized in hitch apparatus mounted upon either the towed or tow vehicle. It is expected that in most installations the hitch will be incorporated into the tongue of the towed vehicle, such as a recreational vehicle trailer and, for purpose of illustration, this type of installation is illustrated in FIGS. 1-7. However, it will be appreciated from the following description with respect to the embodiment of FIGS. 8 and 9 the features of the hitch are equally suited for mounting upon the tow vehicle.

With respect to FIGS. 1 through 7, the tongue of a trailer is represented at 10, consisting of a pair of converging box beams 12 bolted to gusset plates 14 located at the upper and lower surfaces of the beams. The guide tube 16 is located between the gusset plates and is an integral part of the tongue. The guide tube 16 is of a rectangular elongated configuration having an inner end 18 and an outer end 20. The length of the tube is parallel to the normal direction of trailer movement, and the outer end extends slightly beyond the plate 14 and includes lateral edges 22 on each side of the outer end.

The inner end 18 of the tube 16 may serve as the support for the vertically adjustable jack 24. The jack 24 shown is of conventional construction utilizing a jacketed screw operated by crank 26 to raise and lower the caster wheel 28 with respect to the tongue 10. Operation of the jack raises and lowers the vehicle tongue for hitching or leveling purposes, and the caster 28 will permit limited horizontal movement of the trailer in any desired direction. The jack 24 is of conventional construction and, rather than using a caster wheel, the jack may employ a skid plate or other conventional tongue-supporting apparatus well known in the art.

The tube 16 functions as a support for slide 30 whereby the slide may be linearly moved within the tube between fully retracted and fully extended positions. The slide 30 consists of a tube of rectangular transverse cross section of a slightly lesser transverse dimension than the internal dimensions of the tube 16 whereby the slide is freely movable within the tube, but cannot rotate relative thereto.

The upper wall of the slide at the inner end is provided with an opening 32 and a lanced cam surface 34, which functions as a stop abutment as will be later described. At the outer end of the slide a wrist pin 36 extends in a horizontal manner between the lateral sides of the slide pivotally supporting knuckle 38. The knuckle 38 supports a vertically extending pivot pin 40 and includes a circular detent positioning surface 42 and a detent notch 44 extending toward the tube open end. Together, the wrist pin 36, knuckle 38 and pivot pin 40 constitute a universal joint 46 for attaching the arm 48 to the slide 30 for positioning the arm horizontally and vertically with respect to the slide and tube.

The arm 48 is also of a rectangular transverse cross section at its central region 50 for close sliding cooperation with the tube 16, and the arm includes an outer end upon which the hitch socket and cap is located. The inner end of the arm includes a yoke 52 which receives the knuckle 38 and pivot pin 40 whereby the pivot pin pivotally connects the arm to the knuckle for pivotal movement thereto in a horizontal direction. As will be noted in FIG. 5, the lateral sides 54 of the arm adjacent the inner end thereof converge toward each other in the direction of the slide 30, and the purpose for this orientation will be explained below.

Figures 4, 5, 6, 7:
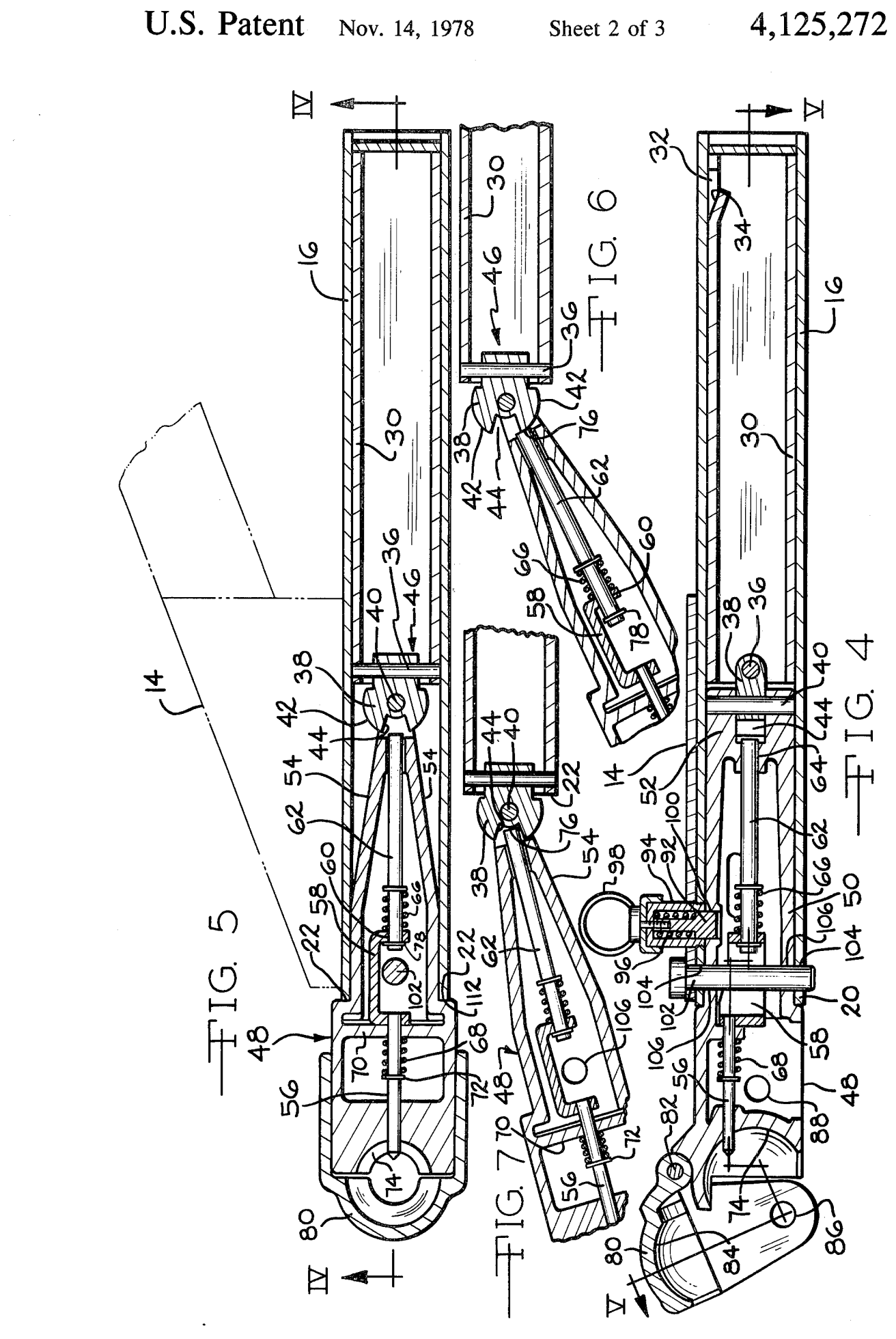

Detent apparatus is located within the arm 48 and, in the embodiment shown in FIGS. 4-7, such detent apparatus includes a longitudinally movable sensing pin 56 affixed to a locking pin by-pass member 58 having an opening 60 defined therein which slidably supports an end of a plunger 62. The plunger 62 is slidably received within a guide bore 64 in the inner end of the arm centrally aligned with the yoke 52, and a compression spring 66 circumscribing the plunger bears against a snap ring and the by-pass member 58 biases the plunger toward the knuckle 38. The pin 56 is also circumscribed by a compression spring 68 bearing against the arm wall 70 biasing the pin 56 to the left by means of the snap ring 72. The sensing pin 56 includes an outer end extending into the semispherical hitch ball socket 74 and the movement of the detent structure to the left, FIG. 5, is restricted by engagement of the by-pass member 58 with the arm wall 70. The plunger 62 is of such length that the plunger end 76 will be out of interfering relationship with the knuckle notch 44 when the member 58 engages wall 70. The snap ring 78, located at the outer end of the plunger 62, restricts plunger movement to the right with respect to the by-pass member, but the plunger 62 is slidably received within the by-pass opening 60 permitting the by-pass member to slide upon the plunger and compress spring 66.

The hitch apparatus socket 74 receives a conventional towing ball, such as shown in FIGS. 8 and 9, and the hitch further includes a cap 80 pivotally mounted upon the arm 48 by horizontal pivot pin 82. The cap 80 also includes a spherical surface 84 whereby the pivoting of the cap to the closed condition results in the surface 84 and socket 74 defining a closed spherical socket adapted to closely receive and trap the towing ball. When the cap is closed the holes 86, defined in the extensions, align with holes 88 formed in the arm whereby a locking pin 90 may be inserted to lock the towing ball in the hitch socket.

A stop detent 92 is mounted upon tube 16 extending through plate 14 and includes a housing 94 threaded into the upper surface of the tube which houses the detent biased downwardly by a compression spring 96. The detent may be raised upwardly against the force of the spring by finger ring 98. A hole 100 is formed in the upper surface of the arm central region 50 for receiving the detent 92 to lock the arm in its retracted position, as shown in FIGS. 4 and 5. Further, detent 92 serves to engage the slide abutment opening 32 when the slide 30 is moved to its fully extended position and thereby limit movement of the slide outwardly from the tube 16 in order to prevent the slide from inadvertently being completely removed from the tube.

During towing a locking pin 102 is also inserted through aligned holes 104 formed in the tube 16 and holes 106 formed in the arm. Thus, both the locking pin 102 and the detent 92 resist forces tending to pull the arm and slide from the tube during towing. It will be appreciated from FIG. 5 that the configuration of the detent by-pass member 58 is such to permit the locking pin to pass through the arm without interference.

Figure 2:
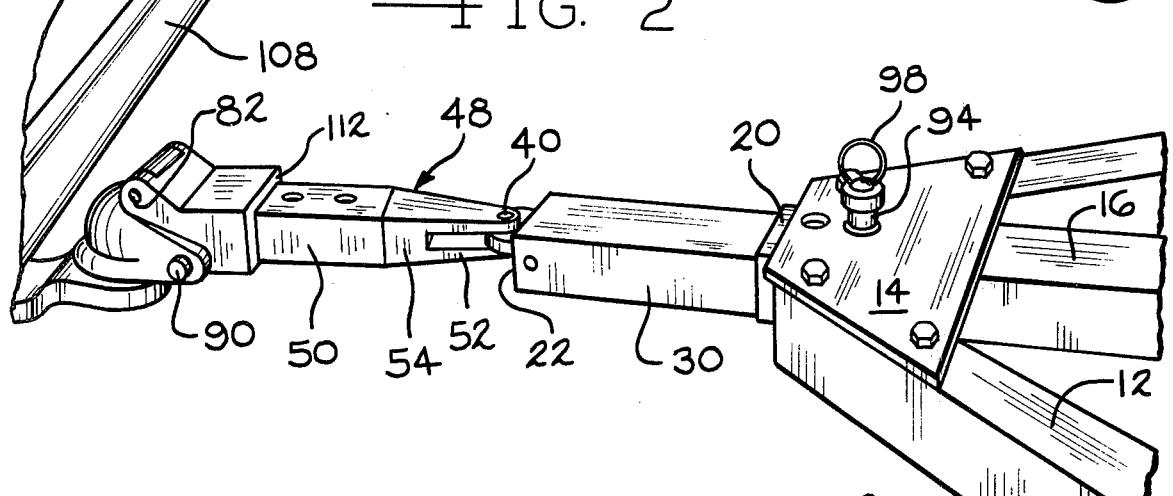
FIG. 2 is a perspective view illustrating the hitch components in the prehitched condition subsequent to forward travel of the tow vehicle substantially aligning the hitch slide and arm, and prior to reversal of the tow vehicle.
Figure 3:
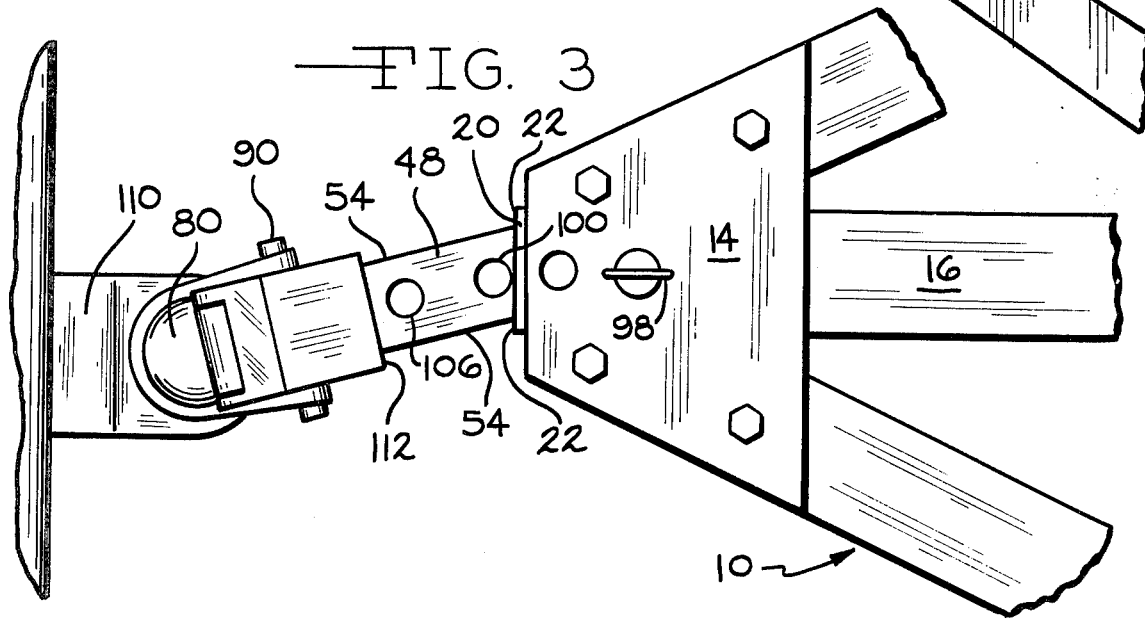
FIG. 3 is a detail plan view of hitch apparatus in accord with the invention, illustrating the relationship of components during reversal of direction of travel of the tow vehicle wherein a lateral side of the arm is being engaged by an edge of the tube to produce final vehicle alignment, and prior to the arm being fully retracted.

The operation of the self-aligning trailer hitch in accord with the invention is described below:

The tow vehicle, generally shown at 108 in FIGS. 1-3, includes the conventional towing ball bracket 110 supporting a conventional towing ball, not visible. The tow vehicle 108 is backed toward the trailer tongue 10 and positioned within about eighteen inches of the tongue hitch apparatus. Assuming the hitch apparatus to initially be in the towing condition while being parked, the operator removes the locking pin 102 from the tube and arm and raises the detent 92 by means of the finger ring 98. Thereupon, the arm 48 and slide 30 may be pulled outwardly from the open end of the tube as far as necessary, or until the detent 92 engages the slide opening 32. Of course, when moving the arm and slide forwardly the finger ring will be released so the detent will slide along the top of the arm and slide.

Once the arm has been removed from the tube 16 so the knuckle 38 is located at the tube open end 20, the universal pivoting action of the joint 46 permits the arm to be moved in a horizontal manner, or raised or lowered. Further, the sliding support of the slide 30 within the tube permits the arm to be moved forward and backward, and it will be appreciated that as the weight of the arm is relatively light the arm may be easily moved into a position that socket 74 may be placed on the tow vehicle ball. The locking pin 90 will be removed from its holes, if it has not been previously removed, to permit the cap 80 to be swung into the ball-receiving position, as shown in FIG. 4, and the universal pivoted support of the arm easily permits the ball to be placed within the socket 74, and the cap 80 closed, and the locking pin 90 inserted into place.

During the initial aforedescribed sequence of operation, the detent plunger 62 has been in the position shown in FIGS. 4 and 5 due to the biasing force of spring 68. In this position the detent end 76 is maintained out of an interfering relationship with the knuckle 38, and the arm may be freely pivoted with respect to the slide. However, when the tow vehicle ball is placed within the socket 74, the ball engages the outer end of the sensing pin 56, shifting the pin 56 and by-pass member 58 to the right. A typical relationship of the components at the initial stage of prehitching after the hitch arm has been placed upon the tow vehicle ball is shown in FIGS. 1 and 6. As will be appreciated, a substantially angular misalignment exists between the lengths of the slide and arm.

If, as is usually the case, the misalignment between the axis of the slide 30 and arm 48 is greater than approximately 15°, the end 76 of the detent plunger is in alignment with one of the knuckle surfaces 42, rather than in alignment with the notch 44, and movement of the detent apparatus toward the joint 46 will cause the plunger end 76 to engage a knuckle surface 42, as shown in FIG. 6. The sliding relationship between the detent by-pass member 58 and the plunger 62 permits a lost motion which compresses spring 66, as shown in FIG. 6, and the plunger will, therefore, be held against the engaged surface 42 by a biasing force produced by spring 66.

After the pin 90 has been inserted in position, the tow vehicle 108 is slowly moved forwardly a distance sufficient to produce a misalignment between the slide and arm no greater than about 15°. The forward distance required by the tow vehicle and trailer is usually only a few feet and the jack caster 28, or tongue support pad, will permit such limited movement without unduly stressing the tongue support mechanism. As forward movement of the tow vehicle occurs, a pulling force on the vehicle tongue 10 is transferred from the slide 30 to the tongue via detent 92 and abutment opening 32. Once the slide and arm have "straightened out" sufficiently the knuckle notch 44 will align with the end 76 of the detent plunger 62, and the spring 66 will force the plunger into the notch, as shown in FIG. 7. It will be noted that the horizontal width of the notch 44 is greater than the diameter of the detent end 76 and this difference in dimensions permits a 15° misalignment between the slide and arm to exist during the aforedescribed preliminary forward prealignment movement of the tow vehicle when the plunger engages the notch.

After the detent plunger has been received within the notch 44, the tow vehicle 108 is slowly driven rearwardly and such rearward motion imposed upon the arm 48 will be transferred to the slide 30 due to the engagement of the plunger 62 and notch. The detent 92 will ride out of the slide abutment opening 32 due to engagement with the cam surface 34 and, as the vehicle 108 is slowly moved in the reverse direction, the slide will retract within the tube without any movement of the vehicle tongue occurring. As the slide is retracted, the yoke end of the arm will also enter the tube and the lateral edges 22, defining the tube end, function as orientating means to engage the lateral sides 54 of the arm wherein the sides of the arm will impose a considerable side thrust on the tube edges and shift the tongue 10 laterally into final linear alignment between the tube 16 and arm 48. During the final stages of backing of the tow vehicle, the central portion 50 of the arm will be received within the tube achieving final coincident parallel alignment between the tube, slide and arm and retraction of the slide and arm into the tube will be limited by engagement of the tube end 20 with the arm shoulder 112.

After the slide and arm are fully retracted within the tube, the detent 92 will snap into the arm hole 100, and the operator will insert the locking pin 102 into the aligned holes 104 and 106, and the hitch is ready for towing. Of course, during the towing operation the detent plunger 62 will be received within the notch 44 as the detent pin 56 is maintained displaced toward the slide due to the presence of the ball within the hitch socket. The jack crank 26 is operated to raise the caster 28 in order to place the tongue weight upon the vehicle 108 and the trailer may now be towed in the conventional manner.

When it is desired to unhitch the apparatus in accord with the invention, the locking pin 90 is removed, the cover 80 swung upwardly and the tow vehicle 108 may be driven forwardly after the jack 24 has been properly positioned.

The presence of the locking pins 90 and 102 renders the aforedescribed apparatus safe in operation and the fact that the arm 48 may be pivoted in any direction relative to the slide 30, as well as extended and retracted with respect to the tube 16, permits a sole operator to connect the heaviest trailers to the tow vehicle without assistance.

The aforedescribed embodiment of a self-aligning hitch mounts the hitch apparatus upon the tongue of the towed vehicle. The inventive concepts can, likewise, be incorporated into hitch apparatus mounted upon the tow vehicle and FIGS. 8 and 9 illustrate such apparatus. In these figures, components similar to those previously described are indicated by primed reference numerals.

The tube 16' is affixed to the underside of the tow vehicle by mounting brackets 114 welded thereto, and the mounting brackets are provided with bolt holes. The tube 16' is of a rectangular transverse cross section and includes the finger-operated detent 92'. A slide 30' is axially positionable within the tube and supports the universal joint 46'. The arm 116 is also slidably received within the open end of the tube 16' and is attached to the universal joint 46' by pivot pin 40'. At its outer end 118, the arm supports a typical towing ball 120 mounted to the arm by the conventional threaded stud 122 and nut 124. Locking pin 102' is received within tube holes 104' and arm holes 106' to lock the arm within the tube during towing.

The arm 116 includes a detent plunger 126 which is biased toward the knuckle 38' by a compression spring 128 bearing against snap ring 130 and the arm web 132. The detent plunger 126 is operated by the U-shaped handle 134 which is attached to the detent and operable from a location below the ball 12, FIG. 8. The operator is able to grasp the handle 134 with a finger and pull on the handle to the left, FIG. 8, to compress spring 128 and withdraw the plunger from the knuckle notch 44'.

In operation, the tow vehicle is backed toward the trailer to be towed, not shown, and stopped in an approximate hitching position. The operator then removes locking pin 102' and raises detent 92' permitting the arm 116 and slide 30' to be extended from the tube 16' in the manner previously described. As the arm is universally adjustable relative to the slide, the ball may be easily positioned into the trailer hitch socket, and the socket locked upon the ball. If the misalignment between the arm and slide necessary to permit hitching is greater than that permitted by the interengagement of the plunger 126 and notch 44', the operator pulls on the handle 134 to remove the plunger from the notch wherein an unrestricted pivoting of the arm is possible. After hitching, the tow vehicle is moved forwardly a distance sufficient to align the arm and slide to permit the plunger 126 to be received within the knuckle notch 44' under the influence of the spring 128. Upon the detent plunger entering the notch the tow vehicle may now be reversed to retract the slide and arm into the tube 16', and the lateral edges 22' of the tube will function to orient the arm relative to the tube during the final stages of retraction. When the arm is fully retracted the detent 92' will be received within arm opening 100', and pin 102' is inserted into place, as shown in FIG. 8. The hitch is now in condition for towing.

It will be appreciated that various modifications to the inventive concept may be apparent to those skilled in the art without departing from the spirit and scope of the invention.

We claim:

1. A self-aligning towing hitch for interconnecting tow and towed vehicles comprising, in combination, an elongated guide adapted to be fixed upon one of the vehicles, a slide movably mounted on said guide for movement in the direction of normal vehicle movement between retracted and extended positions, an elongated arm having an inner end, an outer end and lateral sides, pivot means connecting said arm inner end to said slide for pivotal movement about a vertically extending axis, first hitch means mounted on said arm adjacent said outer end adapted for connection to second hitch means mounted on the other vehicle, orientation means fixed with respect to said guide and disposed adjacent said arm lateral sides during retraction of said slide whereby retraction of said slide produces engagement of said arm lateral sides with said orientation means if said arm is misaligned with respect to said guide to pivot said arm into alignment with said guide and slide direction of movement, detent means interposed between said slide and arm having an operative position restricting pivotal movement therebetween about said pivot axis upon a predetermined angular alignment between said arm and slide direction of movement being achieved, and locking means fixing said arm with respect to said guide upon said slide being retracted.

2. In a self-aligning towing hitch as in claim 1, actuating means operatively connected to said detent means selectively biasing said detent toward said operative position, said actuating means being associated with said first hitch means whereby interconnection of said first hitch means to the second hitch means operates said actuating means.

3. A self-aligning towing hitch for interconnecting tow and towed vehicles comprising, in combination, an elongated guide tube adapted to be fixed upon one of the vehicles extending parallel to the direction of normal vehicle movement and having an open end, an elongated slide slidably received within said tube movable between extended and retracted positions, an elongated arm slidably received within said tube having an inner end, outer end and lateral sides, pivot means connecting said arm inner end to said slide for pivotal movement about a vertical axis, hitch means mounted on said arm adjacent said outer end, said tube open end including spaced lateral edges adapted to engage said arm lateral sides and align said arm with said guide tube upon said slide and arm retracting into said tube, detent means interposed between said slide and arm restricting pivotal movement therebetween about said pivot axis upon a predetermined angular alignment between said arm and tube being achieved, and locking means selectively locking said arm within said tube upon said arm and slide being retracted within said tube.

4. In a self-aligning towing hitch as in claim 3 wherein said tube, slide and arm are of a rectangular transverse cross section.

5. In a self-aligning towing hitch as in claim 3 wherein said pivot means comprises a universal joint permitting pivoting of said arm relative to said slide in both vertical and horizontal directions.

6. In a self-aligning towing hitch as in claim 3, actuating means operatively connected to said detent means selectively biasing said detent means toward an operative position, said actuating means being associated with said hitch means whereby the connection of said hitch means to mating hitch means operates said actuating means.

7. In a self-aligning towing hitch as in claim 3, releasable stop means mounted on said tube and first abutment means defined on said slide engaging said stop means at the full extended position of said slide.

* * * * *